Patented Feb. 10, 1953

2,628,155

UNITED STATES PATENT OFFICE 2,628,155

METHOD FOR THE RECOVERY OF SPENT LIQUORS FROM THE COOKING OF CELLULOSE FROM RAW MATERIAL CONTAINING SILICA

Bengt Herman Emanuel Gruen, Stockholm, Sweden

No Drawing. Application February 1, 1949, Serial No. 74,041. In Sweden December 20, 1948

5 Claims. (Cl. 23—46)

It is desirable to derive cellulose fiber from plant material other than wood because in many countries wood is scarce and is needed for other purposes. Therefore many attempts have been made to make cellulose from various kinds of grass, straw, bamboo and the like and various digestion processes have been employed. Inasmuch as these processes employ alkali as a digesting medium it is necessary to recover this alkali in order to make the process economical. In recovering chemicals, mainly alkali, however, certain difficulties are experienced, especially when the raw materials used have a high content of silica, as silica will accumulate in the spent liquors in the form of soluble alkaline compounds causing sedimentations during the evaporation process and deposits on the inside of tubes and pans and possibly also coating the tubes and walls of boilers and furnaces by the melting of the soda. This decreases the heat economy and causes also loss of alkali.

This invention relates to a method of avoiding the difficulties caused by silica during evaporation of spent liquors from digestion of silica-containing raw materials and, thus, to an improvement in alkali recovery. The process according to this invention is mainly characterized in that the silica in the spent liquors is precipitated by means of lime before the evaporation. Lime can be introduced either as burnt lime or slaked lime, the burnt lime being preferred because its reaction with water in the spent liquor raises the temperature, which in reality is a recovery of the heat spent in the burning of the lime. It also causes a binding of water as calcium-hydroxide whereby the content of solids (combustibles and alkali compounds) is increased.

The precipitation of silica can take place at the temperature of the liquor after its separation from the cellulose, but the process is even more advantageously carried out at higher temperatures up to and even above the boiling point of the liquor, as the reaction requires shorter time at a higher than at a lower temperature. If the reaction is allowed to take place at over-atmospheric pressure in a closed vessel it is possible to keep a temperature higher than that corresponding to the atmospheric boiling point of the liquor. It has, however, been proved, that the precipitating reaction in a certain way is dependent upon time, namely in that in the early stages silica is practically selectively precipitated while after a certain time also organic matter will react with the lime and cause precipitation of organic calcium compounds causing loss of combustible substance in the liquor. It is therefore convenient to allow the reaction only enough time to cause the desired precipitation of silica without a simultaneous loss of organic substance. With a silica content in the spent liquor of 7–10 grams per litre it is advantageous to carry out the treatment with burned lime during a period of 5–10 minutes whereby over 90% of the silica content is precipitated while the precipitate will contain only some few per cent of the content of organic matter of the liquor.

The process of precipitation itself should be carried out during vigorous mixing and stirring and the liquor can afterwards be separated from the precipitate by any useful method such as decanting after settling, straining on stationary or rotary filters, centrifuging and the like.

Lime can be added in a suitable excess above the quantity equivalent to the content of silica in the liquor because it has been found that a greater excess during the precipitating reaction does not cause any greater loss of organic matter provided that the precipitate is rapidly and suitably separated from the liquor.

The filtrate, obtained from the separation of the precipitate should naturally be used in other phases of the pulping process in order to avoid alkali loss.

The invention will be exemplified by analysis reports obtained from various spent liquors resulting from sulphate cellulose cooking with various grasses and bamboos as raw material.

Example

Treatment of black liquor from sulphate-process digestion of wheat straw.

The liquor poured off after digestion of straw according to sulphate process showed after straining the following data:

| | |
|---|---|
| Specific gravity at 17 deg. C | 1.078 |
| pH value at 17 deg. C | 12.15 |
| Bonedry grams per litre | 136.23 |

Analysis of the dehydrated residue:

| | Per cent |
|---|---|
| Loss due to combustion | 54.65 |
| Remaining after combustion | 45.35 |

The liquor contained:

| | |
|---|---|
| $SiO_2$, grams per litre | 9.08 |
| CaO, grams per litre | 0.00 |
| $Na_2O$, grams per litre | 18.60 |

$Na_2O$-content is found through electrometric titration at pH value 7.

200 litres of liquor was poured into a container equipped with a steam coil and heated to 80 deg. C. Burned lime was then added during constant stirring in a quantity of 55 grams per litre. While the stirring was continued samples were withdrawn after 10 minutes and after 25 minutes and filtered. The filtered samples showed the following analysis:

1. After 10 minutes:

| | Percent |
|---|---|
| Specific gravity at 17° C | 1.075 |
| pH at 17° C | 12.60 |
| Bonedry grams per litre | 131.62 |

Analysis of the dehydrated residue:

| | Percent |
|---|---|
| Loss due to combustion | 54.00 |
| Remaining after combustion | 46.00 |

The filtered liquor contained:

| | Percent |
|---|---|
| $SiO_2$, grams per litre | 0.16 |
| CaO, grams per litre | 1.28 |
| $Na_2O$, grams per litre | 23.25 |

2. After 25 minutes:

| | Percent |
|---|---|
| Specific gravity at 15° C | 1.075 |
| pH at 15° C | 12.70 |
| Bonedry grams per litre | 129.68 |

Analysis of the dehydrated residue:

| | Percent |
|---|---|
| Loss due to combustion | 47.28 |
| Remaining after combustion | 52.72 |

The filtered liquor contained:

| | Percent |
|---|---|
| $SiO_2$, grams per litre | 0.03 |
| CaO, grams per litre | 0.97 |
| $Na_2O$, grams per litre | 22.00 |

The same liquor as above was equally treated but this time with a quantity of lime of 40 grams per litre. After 10 minutes' reaction and filtering immediately afterwards the liquor showed the following:

| | Percent |
|---|---|
| Specific gravity at 15° C | 1.075 |
| pH at 15° C | 12.70 |
| Bonedry grams per litre | 128.18 |

Analysis of the dehydrated residue:

| | Percent |
|---|---|
| Loss due to combustion | 48.6 |
| Remaining after combustion | 51.4 |

The filtered liquor contained:

| | Percent |
|---|---|
| $SiO_2$, grams per litre | 0.22 |
| CaO, grams per litre | 0.87 |
| $Na_2O$, grams per litre | 21.70 |

A comparison of the above data clearly shows how the silica content in the liquor can be decreased to such low values, that no difficulties will follow in the treatment during evaporation and burning. The comparison also shows that a lengthening of the time for the reaction under otherwise equal circumstances causes a more complete precipitation of silica as well as that an increase of the added amount of lime within the above practiced limits also causes a more complete precipitation.

Lime has, as already shown, been added in a quantity, which is considerably above the quantity equivalent to the content of silica in the liquor. The reason for this excess is, that the liquor contains considerable quantities of carbonate and that, in order to reach a complete sedimentation of silica, a quantity of lime must be added in excess of that required to bind the carbon dioxide of the liquor.

Liquor from the sulphate cooking of bamboo has been treated according to above described process and in one case the silica content was decreased from 7.03 to 0.3 grams per litre and in another case with a different type of bamboo from 3.01 to 0.11 grams per litre.

By a treatment according to this invention a liquor derived from sulphate cooking of elefant grass the silica content was decreased from 2.81 to 0.04 grams per litre.

I claim:

1. In a process for the recovery of alkali metal values from silica-containing waste sulfate liquor involving the evaporation of such liquor, the steps of removing dissolved silica from the liquor prior to said evaporation to avoid silica deposition during said evaporation which comprise adding lime to the liquor, agitating the mixture, and separating the resulting precipitate from the liquor, the period of time between the addition of the lime and the separation of the precipitate being limited to minimize precipitation of organic matter with the silica.

2. Process as defined in claim 1 in which the mixture of lime and liquor is maintained at a temperature of at least the boiling temperature of the liquor.

3. Process as defined in claim 1 in which a quantity of lime in excess of that equivalent to the silica content of the liquor is added to the liquor.

4. Process as defined in claim 1 in which the lime is added to the liquor in the form of burnt lime.

5. Process as defined in claim 1 in which lime in excess of that equivalent to the silica content of the liquor is mixed with the liquor with vigorous stirring while the mixture is maintained at an elevated temperature, and the mixture is filtered within about 25 minutes after the addition of the lime to the liquor.

BENGT HERMAN EMANUEL GRUEN.

REFERENCES CITED

The following references are of record in the file of this patent:

UNITED STATES PATENTS

| Number | Name | Date |
|---|---|---|
| 1,560,900 | Drewsen | Nov. 10, 1925 |
| 1,992,532 | Kuhnert | Feb. 26, 1935 |

FOREIGN PATENTS

| Number | Country | Date |
|---|---|---|
| 393,962 | Great Britain | June 12, 1933 |
| 528,786 | Great Britain | Nov. 6, 1940 |